Figure 1:
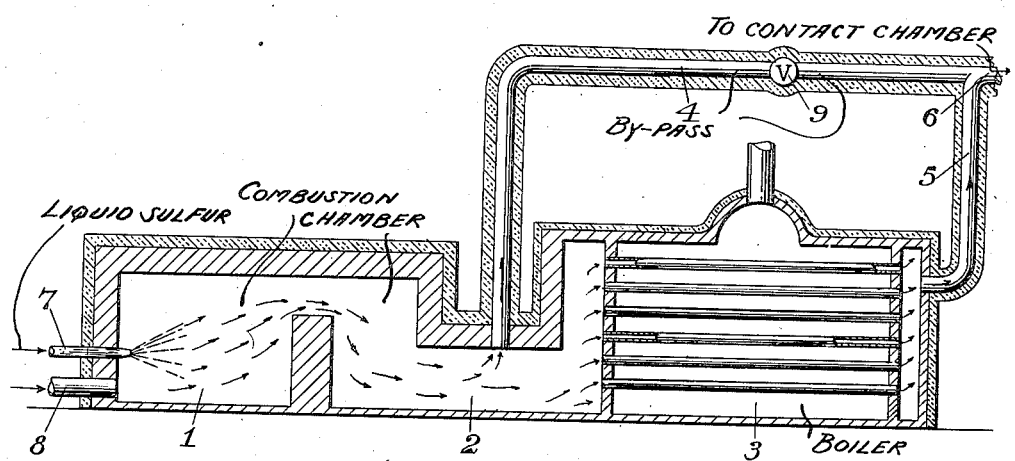

May 11, 1937.  F. CARL  2,079,760

MANUFACTURE OF SULPHURIC ACID BY THE CONTACT PROCESS

Filed Jan. 26, 1935

Fred Carl INVENTOR.

BY David Katz.

ATTORNEY.

Patented May 11, 1937

2,079,760

UNITED STATES PATENT OFFICE 2,079,760

MANUFACTURE OF SULPHURIC ACID BY THE CONTACT PROCESS

Fred Carl, Wilmington, Del., assignor to E. I. du Pont de Nemours & Company, Wilmington, Del., a corporation of Delaware Application January 26, 1935, Serial No. 3,564

1 Claim. (Cl. 23—176)

This invention relates to an improved process and apparatus for the manufacture of sulphuric acid by the contact process. More particularly, my invention deals with regulation of the temperature of the sulphur dioxide gases produced as an intermediary product in this process, prior to their entry into the catalytic or "contact" chamber (also known as "converter"), wherein they are oxidized to sulphur trioxide.

In the specification and claim below, when I speak of sulphur dioxide gases generally, I am referring to the mixture of gases produced in the combustion chamber and containing as principal ingredients sulphur dioxide, oxygen and nitrogen. When I speak of sulphur trioxide gases, I am referring to the mixture of gases issuing from the "converter" or "contact-chamber", and consisting principally of sulphur trioxide, nitrogen, excess air, and sometimes unreacted sulphur dioxide.

The contact-process of producing sulphuric acid is well known in the art, and has been developed into a great many systems or modifications. Some of these start with iron pyrites as raw material. Others use brimstone, or crude sulphur. My present invention is particularly concerned with the processes of the latter type.

In all of these systems, the raw material is burned in a combustion chamber, which has at this stage undergone development into a great many modifications. The combustion gases consisting principally of nitrogen, sulphur dioxide and oxygen are then cooled, since further conversion into sulphur trioxide succeeds from the economical viewpoint only when the temperature of the gases entering the converter is maintained within a certain optimum range, generally 325 to 425° C. A number of systems for cooling are described in Bulletin 184 of the U. S. Bureau of Mines (by Wells and Fogg, 1920), as well as in the patent literature. (See, for instance, U. S. Patent No. 1,384,566 to Merriam).

In U. S. Patent No. 1,545,381 to F. C. Zeisberg, still a different system is described, wherein a steam generator is used as a cooler, whereby the heat removed from the cooling sulphur dioxide gases is converted into useful energy in the form of steam. In this system, in order to realize the maximum efficiency of heat recovery, it is the practice to operate under such conditions as to produce a gas mixture at substantially maximum temperature. This is accomplished by limiting the supply of air, so as to produce a gas mixture of as high an $SO_2$ content as practicable.

Neither of these well-known methods, however, provides a flexible and economical control of the temperature of the gas. The process of Merriam necessitates controlling the cooling medium, which on a plant scale is beset with considerable difficulty, and does not recover usefully the heat removed. The process of Zeisberg does recover the removed heat usefully, but a steam boiler possesses little flexibility as regards control of the temperature of the hot gases discharged from the boiler setting.

It is accordingly an object of my invention to provide a process and apparatus for regulating the temperature of the sulphur dioxide gases entering the converter, which is characterized by both flexibility and heat economy.

Another object of my invention is to provide means for raising the temperature of the cooled sulphur dioxide gases in cases where they have been cooled below the optimum temperature range for conversion into $SO_3$.

Another object of my invention is to provide means for accomplishing the aforegoing objects easily and without unduly complicating the apparatus employed.

Other and further important objects of this invention will appear as the description proceeds.

Figure 2:
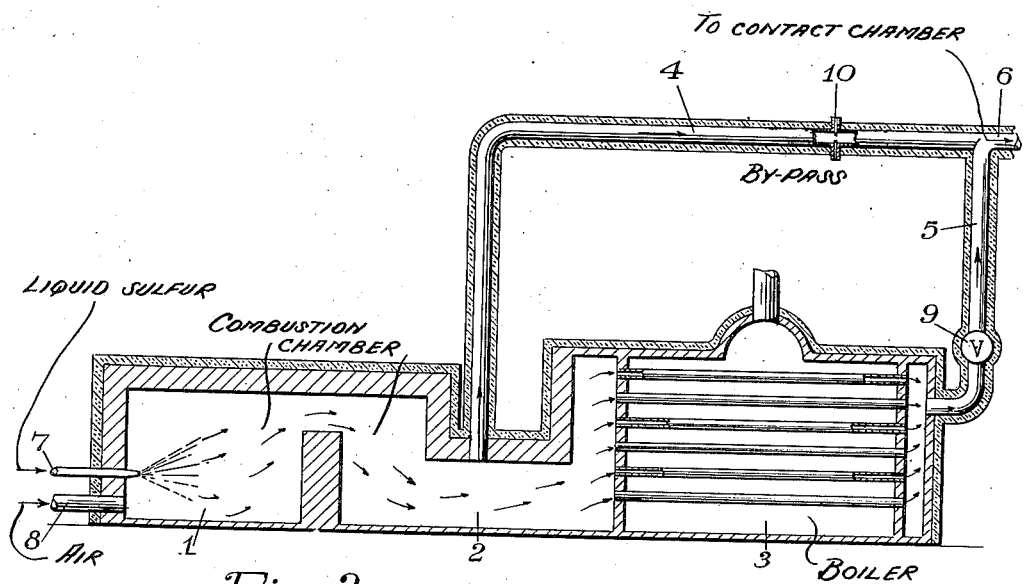

The means by which this combination of desirable ends is accomplished will be best understood by reference to the annexed drawing, which is hereby made part of this disclosure. In said drawing, Figure 1 shows diagrammatically a side elevation of one type of apparatus suitable for carrying out my invention. Figure 2 shows a similar elevation of a slightly modified embodiment.

In these figures, 1 is a combustion chamber in which the sulphur is burned and 2 is a connecting piece such as a pipe or channel through which the products of combustion pass to a horizontal fire-tube boiler 3. A fire-tube boiler has been selected only by way of example. Any other type of boiler may be used.

To the combustion chamber are supplied, in regulable amount, molten sulphur under pressure through line 7 which terminates in a spray nozzle, and dry air under pressure through line 8.

In the fire-tube boiler 3, which is fitted with the usual water feed line, steam dome, steam discharge line, gages, etc., (not shown) the temperature of the hot gases is reduced by passage through the tubes, from say 800° C., when a 10% $SO_2$ gas is being produced, to about 250° C., and the cooled gases leave the boiler setting through line 5. A temperature of 250° C. is, however, too low for commercial sulphuric acid catalysis, and before conversion can occur this gas must be raised to a higher temperature, say 325° to 425° C. This is accomplished by passing around the boiler, through line 4, a portion of the hot gas from the burner. In Figure 1 the resistance to gas flow in the by-pass is less than through the boiler tubes. The amount of hot gas by-passed is therefore, easily controllable by manipulation of valve 9.

That temperature control could be practicably effected in the present system by by-passing was entirely unforseen, because of the high temperature and high concentration of the gases involved in this system. These two factors conspire to produce a particularly corrosive gas which would be expected to attack and destroy a by-pass or valve made of the usual materials employed in boiler construction.

In Figure 2 the by-pass 4 is constricted or provided with a fixed resistance 10, whereby its resistance to flow of gases is greater than that of the boiler tubes. The valve 9 is then placed in pipe 5 at the exit end of the boiler, and the flow of gases is controlled as before by manipulation of valve 9. In this embodiment, the valve comes in contact with relatively cool gases only, and is not exposed to the deleterious action of the hot, concentrated gas.

The mixture of hot and cooled gas is then passed through line 6 to the converter. The temperature of this mixture responds instantly to changes in the setting of valve 9, and the control of this temperature is effective over wide ranges of amount of gas and strength of gas, which latter are controlled by regulation of the molten sulphur supply and air supply. It is, of course, preferred that the combustion chamber, boiler and all connecting pipes should be well insulated against heat loss, in order to produce the maximum amount of steam.

It will be seen now that my improved process provides an easy, prompt, and accurate control of the gas temperature regardless of the rate at which the apparatus is operated, and at the same time enables the recovery in the form of steam of substantially all the heat which is removed from the burner gas.

It will be understood that, while I have described my invention in great detail for the purpose of illustration, the details of my process and apparatus are susceptible to wide variation and modification without departing from the spirit of my invention. Thus in lieu of a liquid sulphur burner, a powdered sulphur burner may be used, or one of those types in which the sulphur is liquefied locally just prior to combustion. Instead of a fire-tube boiler, any suitable type of steam generator may be applied. Its tubes may be made of the usual materials for steam boilers, for instance, steel, since at the high temperature of the $SO_2$ gases no condensation of acid and subsequent corrosion take place. (See further U. S. Patent No. 1,545,381).

Many other variations and modifications will be apparent to those skilled in the art.

I claim:

In combination with apparatus for the manufacture of sulphuric acid by the contact process, a combustion chamber for burning liquid sulphur to produce sulphur dioxide gases of high concentration and temperature, a tubular steam boiler of the type commonly used in the power industry for generating steam from water by thermal contact with hot combustion gases, means for conveying the aforementioned sulphur dioxide gases through certain passages within said boiler normally adapted for receiving said combustion gases, and a by-pass associated with said boiler for shunting a controllable part of the hot sulphur dioxide gases and for mixing them further with the cooled gases issuing from said boiler whereby to produce a mixture of gases at an optional predetermined temperature, the by-pass being constructed so as to have greater resistance to flow of gases than the boiler tubes, and the conduit line at the discharge end of the boiler tubes being provided with a valve, whereby to control the relative flow of gases through the boiler tubes and by-pass.

FRED CARL.